(12) United States Patent
Cassoni (10) Patent No.: US 6,357,741 B1
(45) Date of Patent: Mar. 19, 2002

(54) VELOCITY ADJUSTABLE GRIPPERS ON SLIDING CARRIAGE

(75) Inventor: Robert Paul Cassoni, Centerville, OH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/488,254

(22) Filed: Jan. 20, 2000

(51) Int. Cl.⁷ .................................................. B65H 29/04
(52) U.S. Cl. ..................... 271/206; 271/204; 294/103.1; 294/115; 294/119.1; 198/803.3; 198/803.9
(58) Field of Search ................. 198/803.1, 803.3–803.7, 198/803.9; 271/204, 205, 206, 182; 294/99.1, 104, 105, 103.1, 113, 115, 119.1

(56) References Cited

U.S. PATENT DOCUMENTS

| | | | | |
|---|---|---|---|---|
| 3,831,932 A | * | 8/1974 | Conrad | 271/204 X |
| 3,948,508 A | * | 4/1976 | Kanazawa | 271/206 |
| 4,320,894 A | * | 3/1982 | Reist et al. | 271/204 X |
| 5,064,187 A | * | 11/1991 | Muller | 271/204 |
| 5,178,262 A | * | 1/1993 | Merkli et al. | 271/204 X |
| 5,360,101 A | * | 11/1994 | Carlen | 198/803.7 |
| 5,709,120 A | * | 1/1998 | Shilling | 294/115 X |
| 5,727,783 A | | 3/1998 | Tassinari | 271/185 |
| 6,227,588 B1 | * | 5/2001 | Cassoni | 294/99.1 |

* cited by examiner

Primary Examiner—Christopher P. Ellis
Assistant Examiner—Patrick Mackey
(74) Attorney, Agent, or Firm—Davidson, Davidson & Kappel, LLC (57) ABSTRACT

A movable gripper unit including a housing and a first gripper arm and a second gripper arm for gripping a printed product. The first and second gripper arms are slidingly supported with respect to the housing. The housing is movable along a track. Also disclosed is a method of gripping a printed product including gripping a printed product in a gripper unit and moving the printed product with respect to the gripper unit while the printed product remains gripped.

21 Claims, 14 Drawing Sheets

VELOCITY ADJUSTABLE GRIPPERS ON SLIDING CARRIAGE

BACKGROUND OF THE INVENTION

1. Field of the Invention

The present invention relates generally to printing presses and more particularly to a device and method for transporting printed products.

2. Background Information

Web printing presses print a continuous web of material, such as paper. The continuous web then is cut in a cutting unit so as to form book blocks. These book blocks can be sections of a newspaper, for example. In order to transport or process the book blocks, for example to perform a trimming operation, it is often desirable to firmly grip the book using grippers which are moveable along a track.

U.S. Pat. No. 5,727,783 purports to disclose an apparatus for the delivery of sheets of printed products. A plurality of grippers move along a track at a certain pitch and hold the printed products. The printed products however are fixed with relation to their respective gripper, and must be transferred to a deceleration device to be decelerated. This transfer can cause damage to the printed products.

BRIEF SUMMARY OF THE INVENTION

An object of the present invention is to provide for a device and method for gripping and transporting printed products whereby the printed products may move relative to the grippers. An additional or alternative object of the present invention is to reduce potential damage to printed products.

The present invention provides a gripper unit including a housing, and a first gripper arm and a second gripper arm for gripping a printed product, the first and second gripper arms slidingly with respect to the housing. The housing is movable along a track.

Since the first and second gripper arms may slide with respect to the housing, the speed of the printed product held by the gripper arms may be varied with respect to the track velocity. This speed variation may occur even while the printed product is firmly held by the gripper arms.

The first gripper arm preferably is attached to a first bar, and the second gripper arm to a second bar. Each bar is attached at each end to a slidable carriage, slidable in a slot formed in a side of the housing, which preferably is of an inverted U-shape. The first bar preferably is fixed to with respect to the carriages at its end, and the second bar preferably can rotate so as to move the second gripper arm to grasp a printed product against the rotationally-fixed first gripper arm.

The rotatable second bar preferably is spring-loaded with respect to the carriages at its end, so that the second gripper arm is forced into an open position.

An actuating lever attached to the rotatable second bar and one of the carriages can move the second bar against the spring force so that the second gripper arm grasps the printed product. Moreover, a cam can lock over center so as to hold the lever in a closed position. A latch can then lock the lever in the closed position, so that the second bar cannot rotate back to the open position.

Once the latch is unlatched, the product can be released, since the spring-loading of the second bar forces the second gripper arm to an open position.

A cam may also be provided, and connected to a V-shaped hinge having two arms. One arm is connected to the side of the housing and another arm to the slidable carriage. A cam follower acting on the cam can flatten the V-shaped hinge, so as to move the slidable carriage in the slot with respect to the housing. The hinge may lock over center. Each side of the gripper unit preferably has a cam/hinge arrangement.

The present invention also provides a gripping device including a track and a plurality of gripper units running in the track, each gripper unit including a housing, and a first gripper arm and a second gripper arm for gripping a printed product, the first and second gripper arms slidingly supported within the housing.

The gripping device may further include a chain drive for driving the gripper units, preferably at a constant speed. A cam follower may be provided to slide the gripper arms of each gripper unit with respect to the housing, so as to change the velocity of the printed products while the products remain gripped. The cam follower may interact with a cam connected to a slidable carriage supporting the gripper arms within the housing.

The present invention also provides a method of gripping a printed product including gripping a printed product in a gripper unit and moving the printed product with respect to the gripper unit while the printed product remains gripped. The printed products preferably are gripped by two gripper arms and then slid within a slot in a housing during the moving step. Advantageously, a cam interaction can be used to effect the sliding motion.

Preferably, a second of the gripper arms is rotatable and the method includes locking the second arm in a closed position with a latch and releasing the latch to release the product.

BRIEF DESCRIPTION OF THE DRAWINGS

Two preferred embodiments of the present invention are described below by reference to the following drawings, in which.

DETAILED DESCRIPTION

Figure 1:
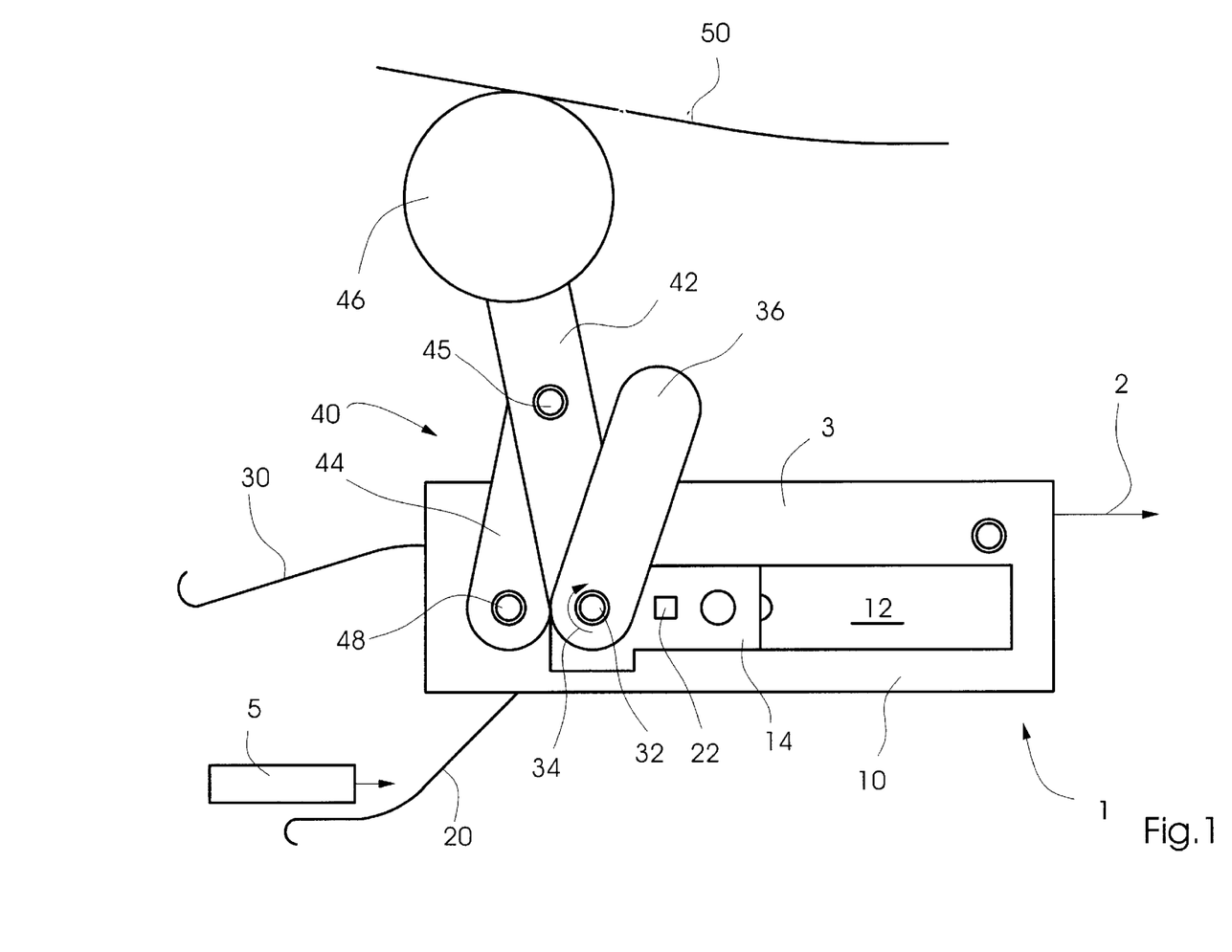
FIG. 1 shows a first side of a gripper unit of a first embodiment of the present invention in an open position running along a track.

FIG. 1 shows a gripper unit 1 running on a track or path 2, for example through a constant-speed chain. Gripper unit 1 includes a housing 3 having a first side 10 and a second side 110 (shown in FIG. 4). Housing 3 thus may be of an inverted U-shape for example. First side 10 has a slot 12 in which a carriage 14 can slide back and forth. Gripper unit 1 includes a first gripper arm 20 and a second gripper arm 30 for gripping a printed product 5. First gripper arm 20 is fixed with respect to carriage 14, for example by being attached to a bar 22, which connects fixedly to another carriage in a slot on the second side of housing 3.

Second gripper arm 30 is attached fixedly to a bar 32, which is rotatable within carriage 14. Second gripper arm 30 is spring-loaded with respect to carriage 14 to rotate in the direction of arrow 34, so that second gripper arm 30 is forced to an open position as shown. An actuating lever 36 is fixedly attached to bar 32. One arm 42 of a V-shaped hinge 40 is rotatably attached to bar 32, and rotatably attached to a second arm 44 of hinge 40 by a pin 45. The second arm is rotatably attached to the housing 3 by a pin 48. A cam 46 is attached fixedly to arm 42.

Figure 2:
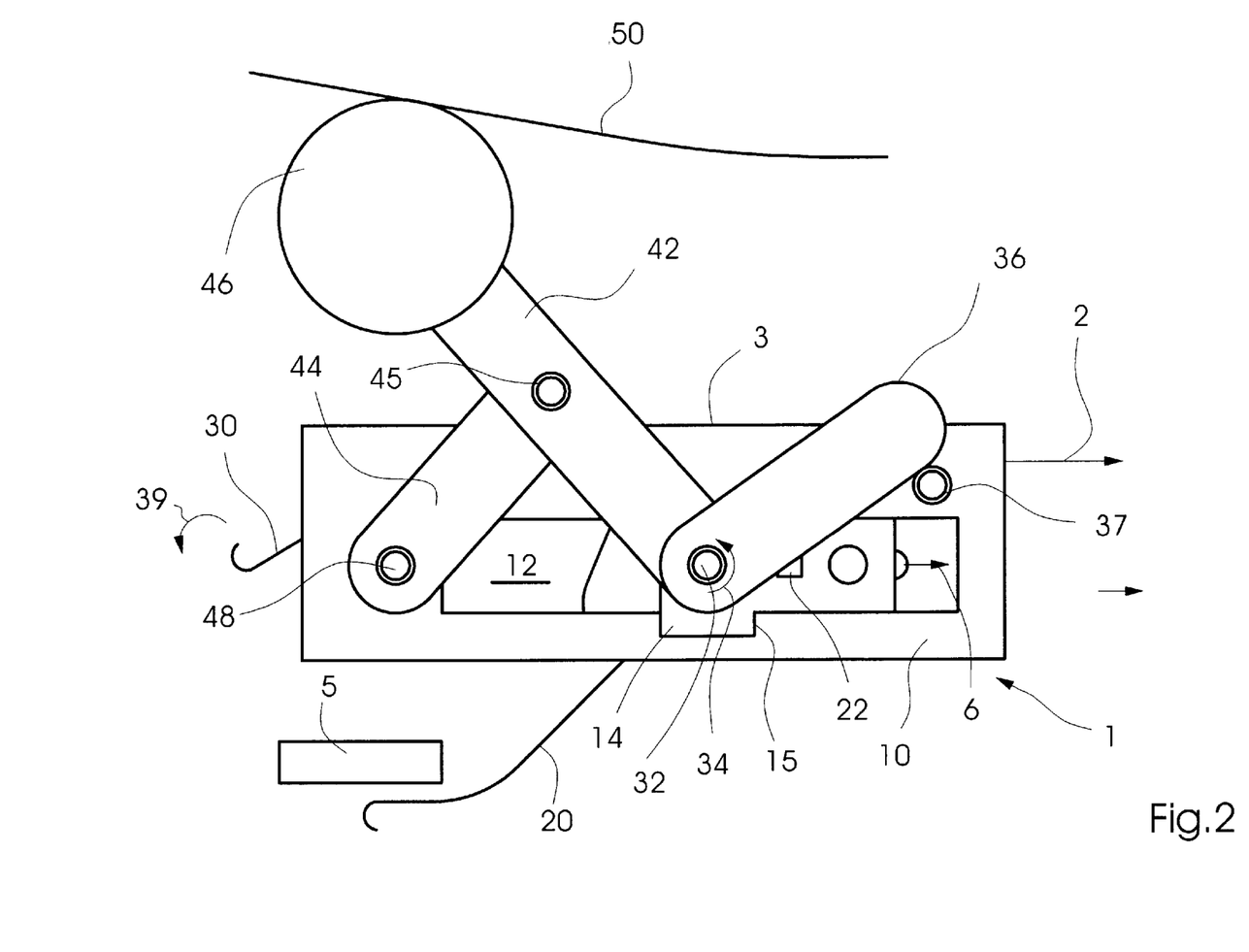
FIG. 2 shows a first side of the gripper unit of FIG. 1 with the gripper arms advanced with respect to the housing.

Cam 46 can be acted upon by a cam follower 50, so as to forced hinge 40 to open, thereby sliding carriage 14 forward in slot 12. FIG. 2 shows the carriage 14 being slid forward in slot 12 in the direction of arrow 6. As actuating lever 36 interacts with actuating pin 37, lever 36 is forced in the direction of arrow 35, i.e. against the spring force represented by arrow 34 in FIG. 1. Actuating arm 36, which is fixedly attached to bar 32, thus causes bar 32 to rotate counterclockwise.

Since second gripper arm 30 is fixedly attached to bar 32, second gripper arm 30 rotates downwardly as indicated by arrow 39.

Figure 3:
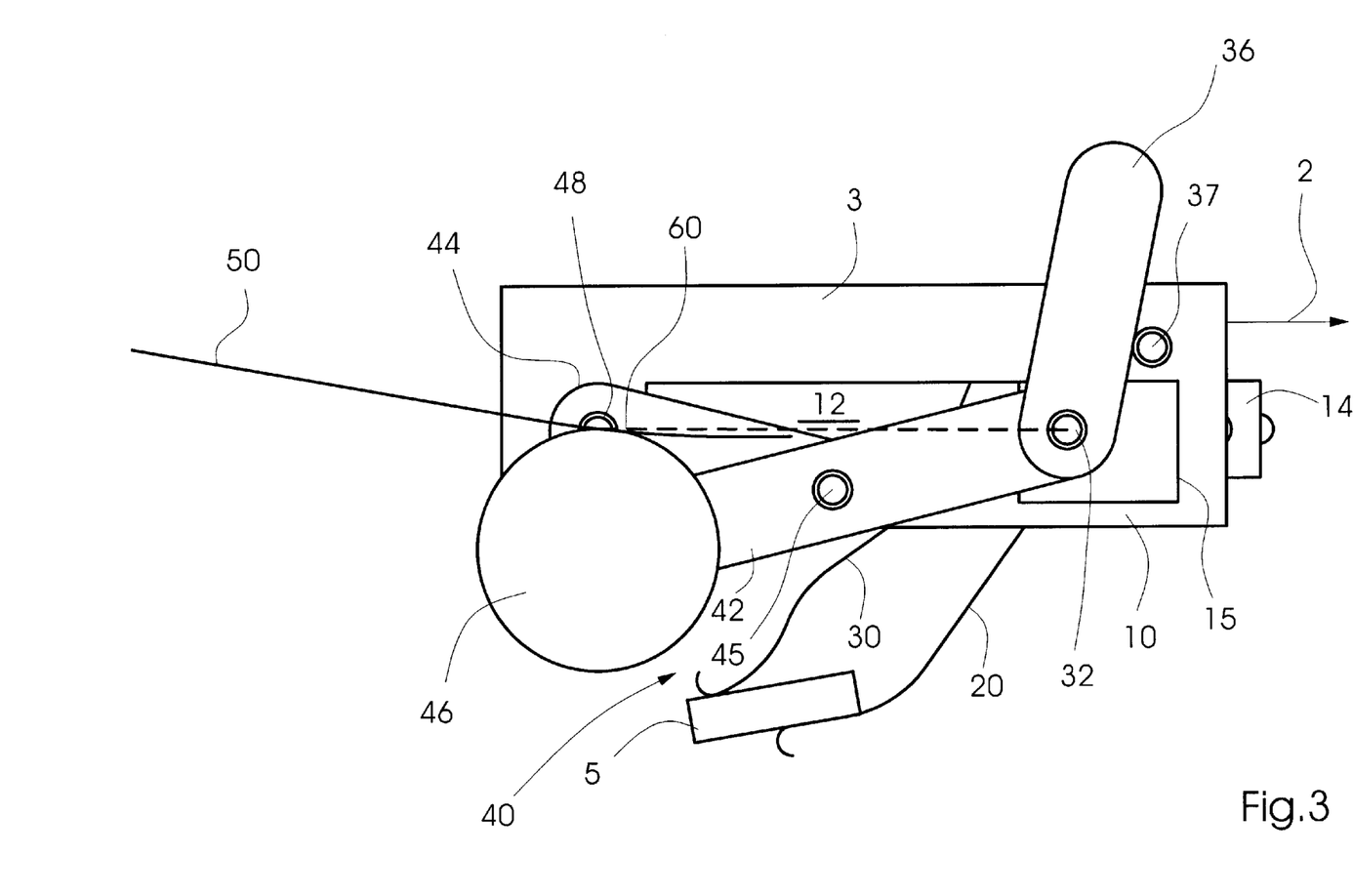
FIG. 3 shows a first side of the gripper unit of FIG. 1 with the gripper arms locked closed.

As shown in FIG. 3, cam follower 50 has forced cam 46 downwardly, so that hinge 40 locks over center line 60. Carriage 14 is moved to a forwardmost position in slot 12. An end of carriage 14 may be inward of slot 12 and extend beyond the housing 3, however carriage 14 may not move more forwardly owing to step 15 (see also FIG. 2) which interacts with the end of slot 12.

In the position shown in FIG. 3, lever 36 has moved counterclockwise so that bar 32 and gripper arm 30 have rotated to grip printed product 5.

Figure 4:
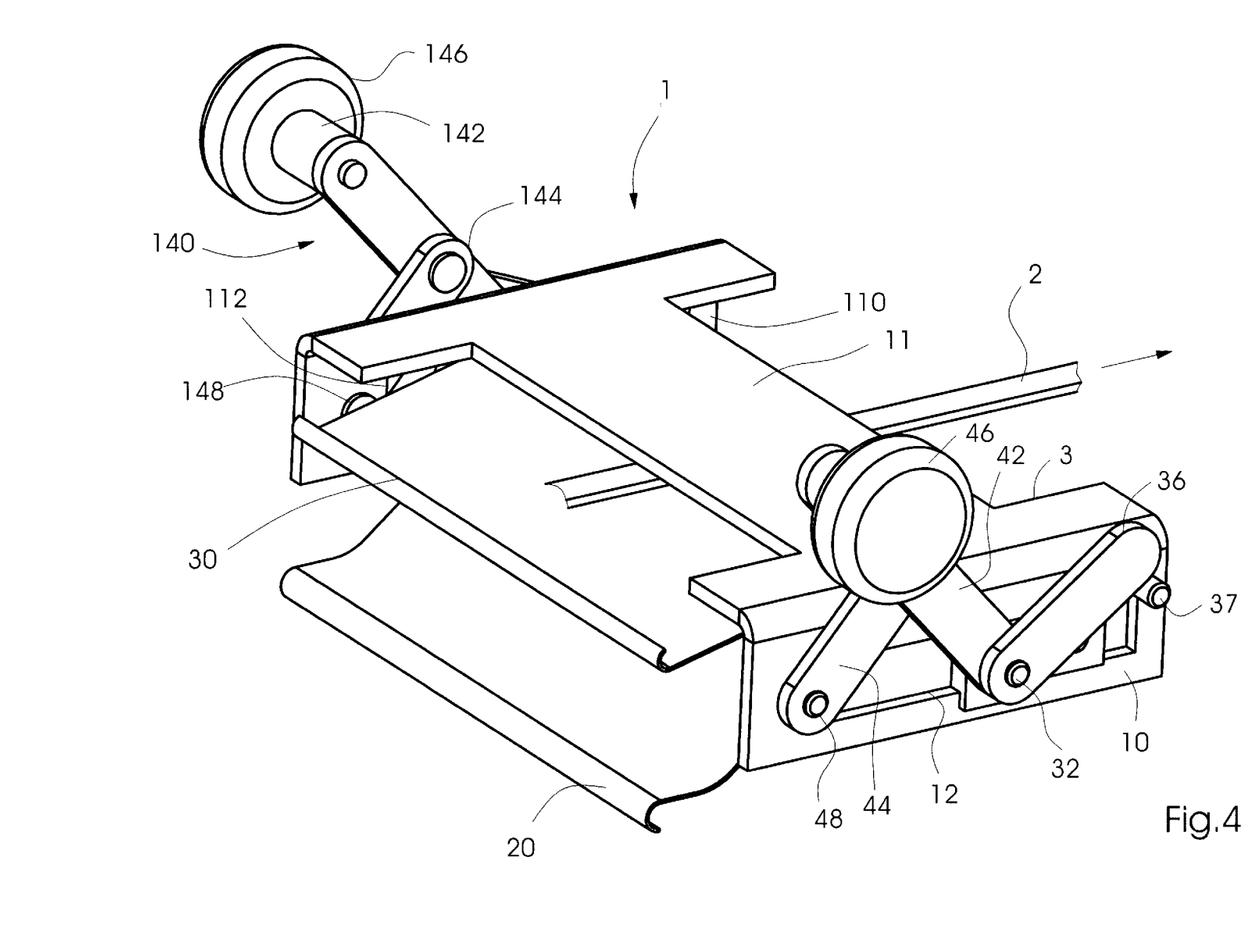
FIG. 4 shows a perspective view of the gripper units as shown in FIG. 2.

FIG. 4 shows a perspective view of the gripper unit 1 as shown in FIG. 3. Housing 3 includes first side 10, second side 110 and a top side 11, which can run on track 2, shown schematically. Second side 110 has a slot 112 in which a carriage can slide. Also near second side 110 of gripper unit 1 is a cam 146 supported on a V-shaped shaped hinge 140 having a first arm 142 and a second arm 144.

Figure 5:
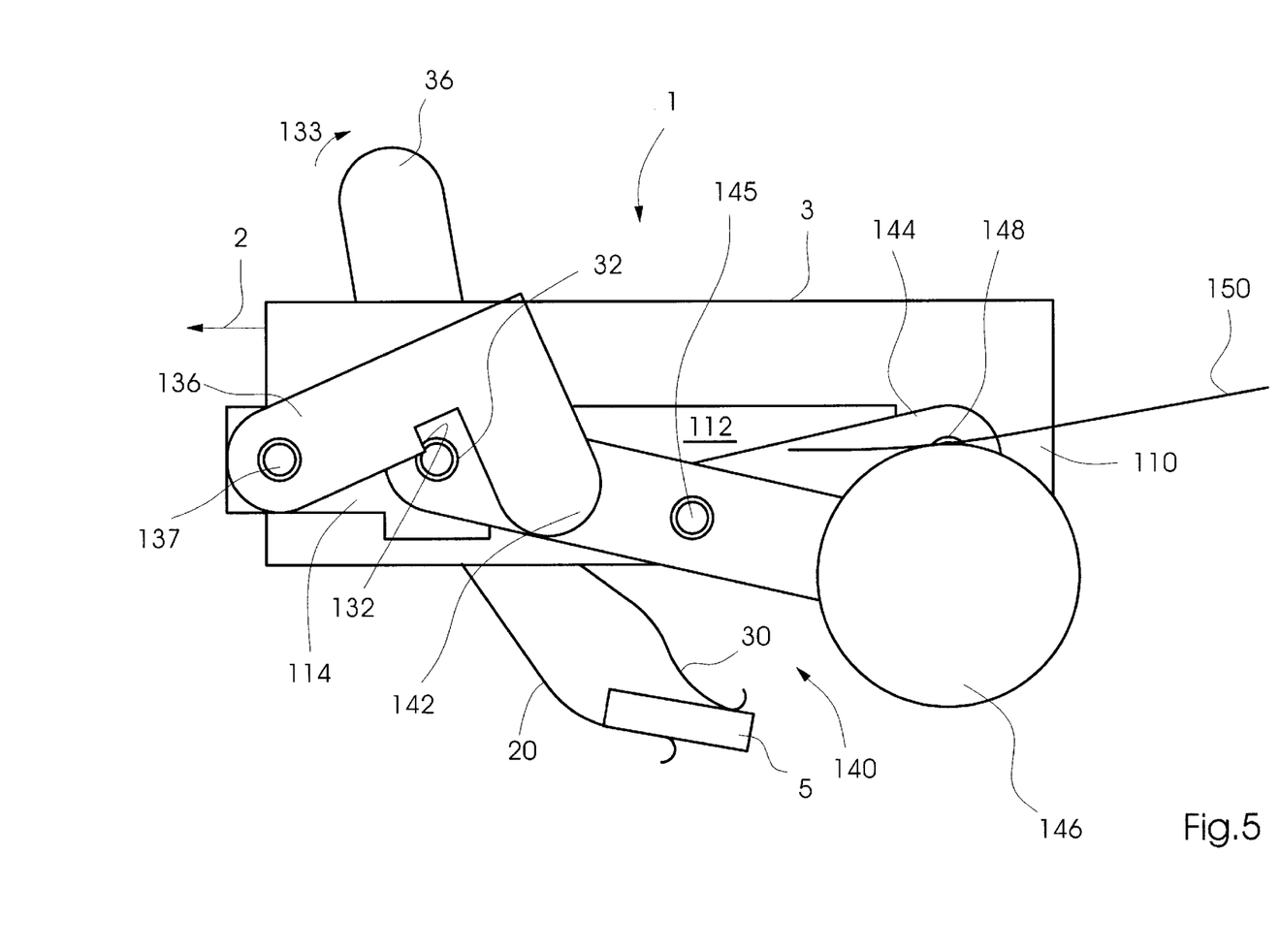
FIG. 5 shows a second side of the gripper unit as shown in FIG. 3.

FIG. 5 shows the side of gripper unit 1 opposite the side shown in FIG. 3. Second hinge 140 is locked over center by a second cam follower 150 acting on cam 146. Arm 144 of hinge 140 is rotatably connected to a pin 148 and to a pin 145. Arm 142 of hinge 140 is connected to pin 145 and to bar 32. A carriage 114 is slid forward in slot 112 by the action of cam 146, which is forced downwardly by cam follower 150.

A latch 136 is attached rotatably by a pin 137 to carriage 114, so as to be act clockwise about pin 137. This clockwise force can be effected for example using a spring, or alternately can occur simply from the center of gravity of latch 136 always being located behind pin 137. As actuating lever 36 was moved in direction 133 to rotate bar 32 as described with respect to FIG. 3 above, latch 136 locks bar 32 by interacting with a step 132 at a second end of bar 32. Latch 136 thus prevents bar 32 from rotating counterclockwise as shown in FIG. 5, i.e. to prevent second gripper arm 30 from opening.

Gripper unit 1 thus may travel along track 2 with printed product 5 gripped, preferably at a constant speed. To change the velocity of the printed product along track 2, cam followers can act on cams 46 and 146 to slide carriages 14 and 114 with respect to the housing 3, which may travel at constant velocity. Thus the gripper arms may slide back and forth as determined by the cam follower shape. This ability to change velocity without varying the housing velocity has several advantages, including eliminating or reducing the need to have a separate deceleration device to decelerate the printed products.

Figure 6:
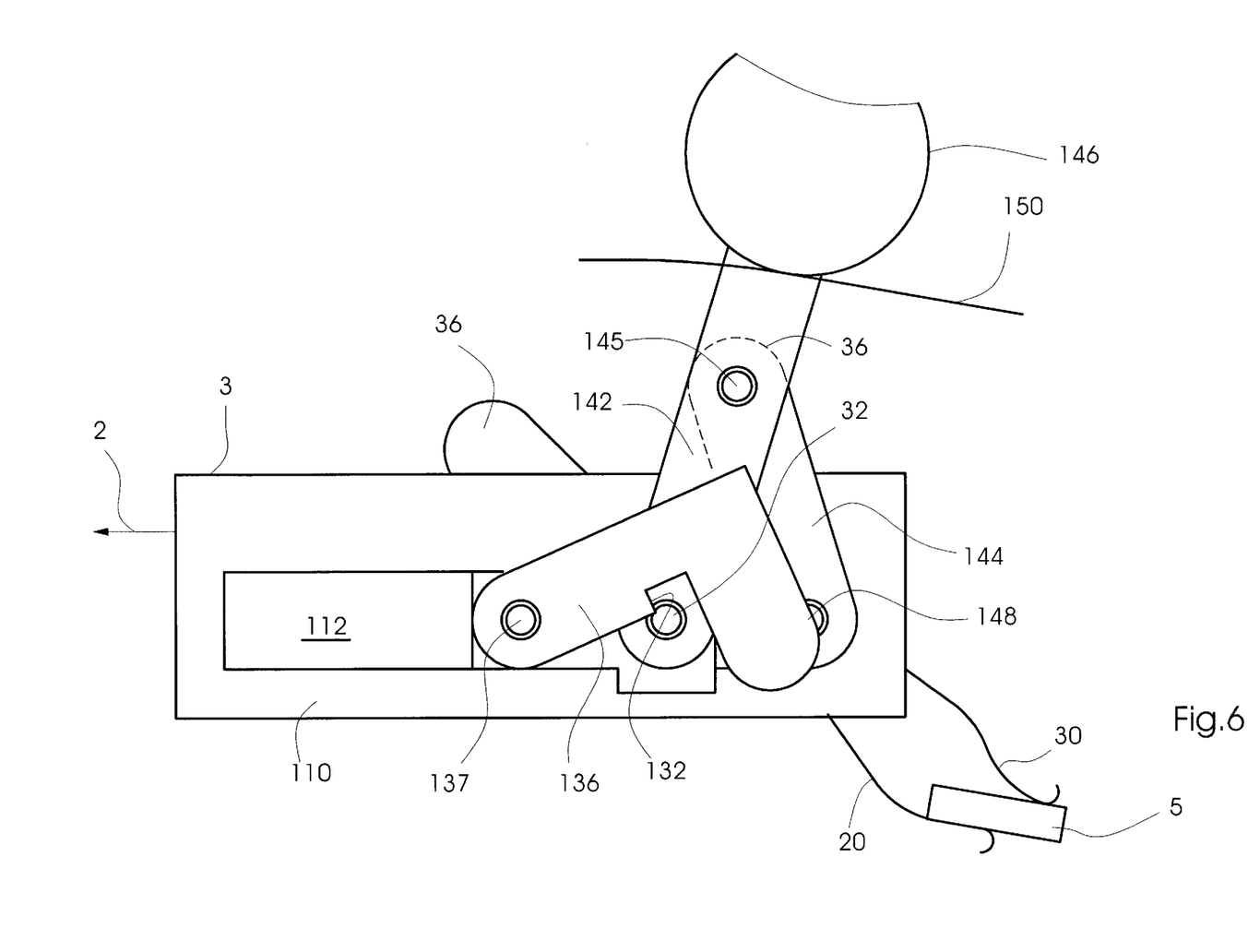
FIG. 6 shows a second side of the gripper unit with the gripper arms slid to the rear of the gripper unit housing.
Figure 7:
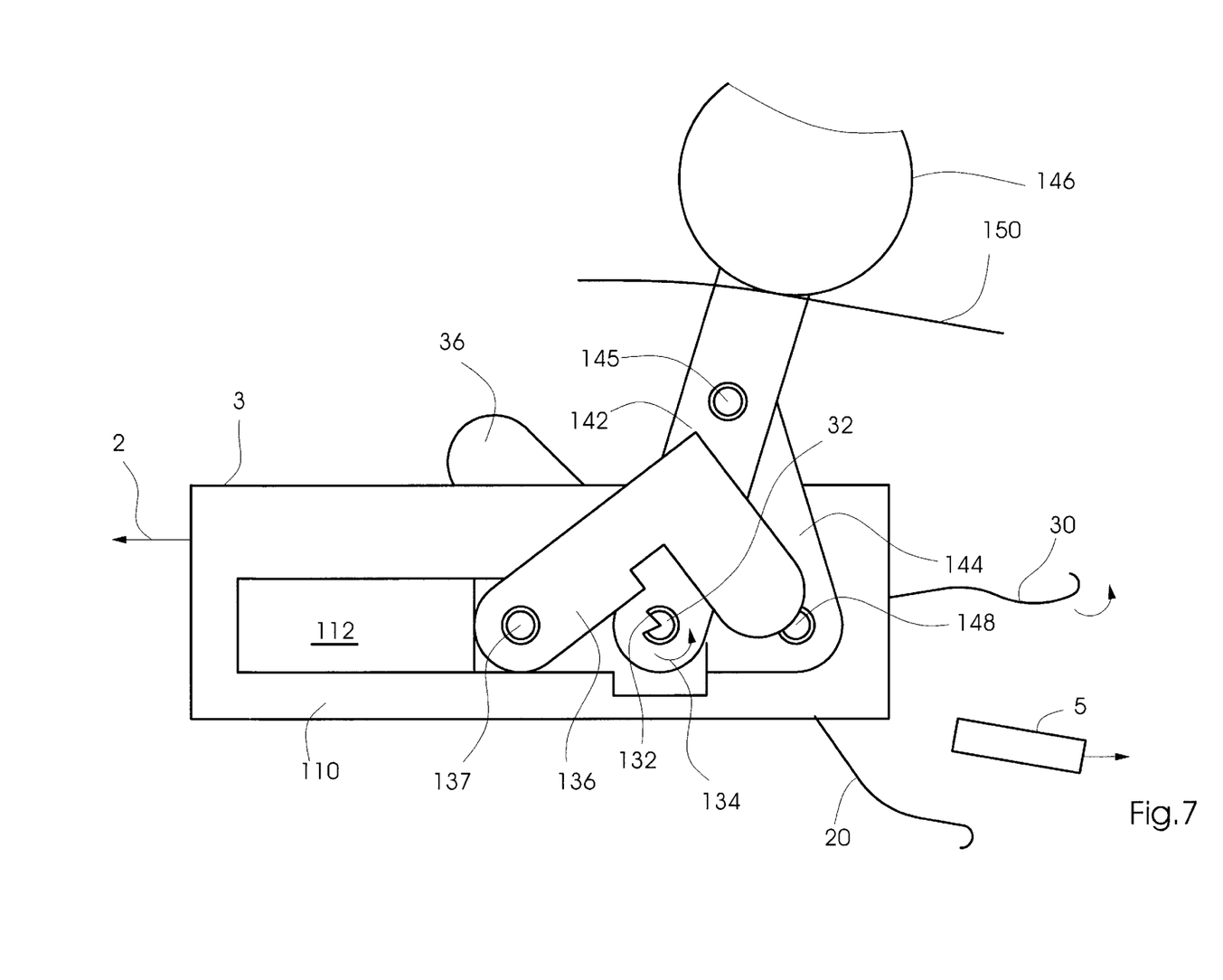
FIG. 7 shows the gripper unit as in FIG. 6, but with the gripper arms sprung open.

To release the gripped printed product or signature, the cams are forced to an uppermost position by their respective cam followers. As shown in FIG. 6, cam follower 150 forces cam 146 upwardly so that latch 136 almost contacts pin 148. Printed product 5 is still gripped. In FIG. 7 cam 146 has been forced higher, so that latch 136 interacts with pin 148 to rotate and release bar 32 and step 132. Since bar 32 is spring-loaded in direction 134, bar 32 rotates, as do lever 36 and second gripper arm 30, as shown by arrow 135.

Printed product 5 thus is no longer gripped and may be deposited, for example, on a conveyor belt, or transferred to another gripping device.

Figure 8:
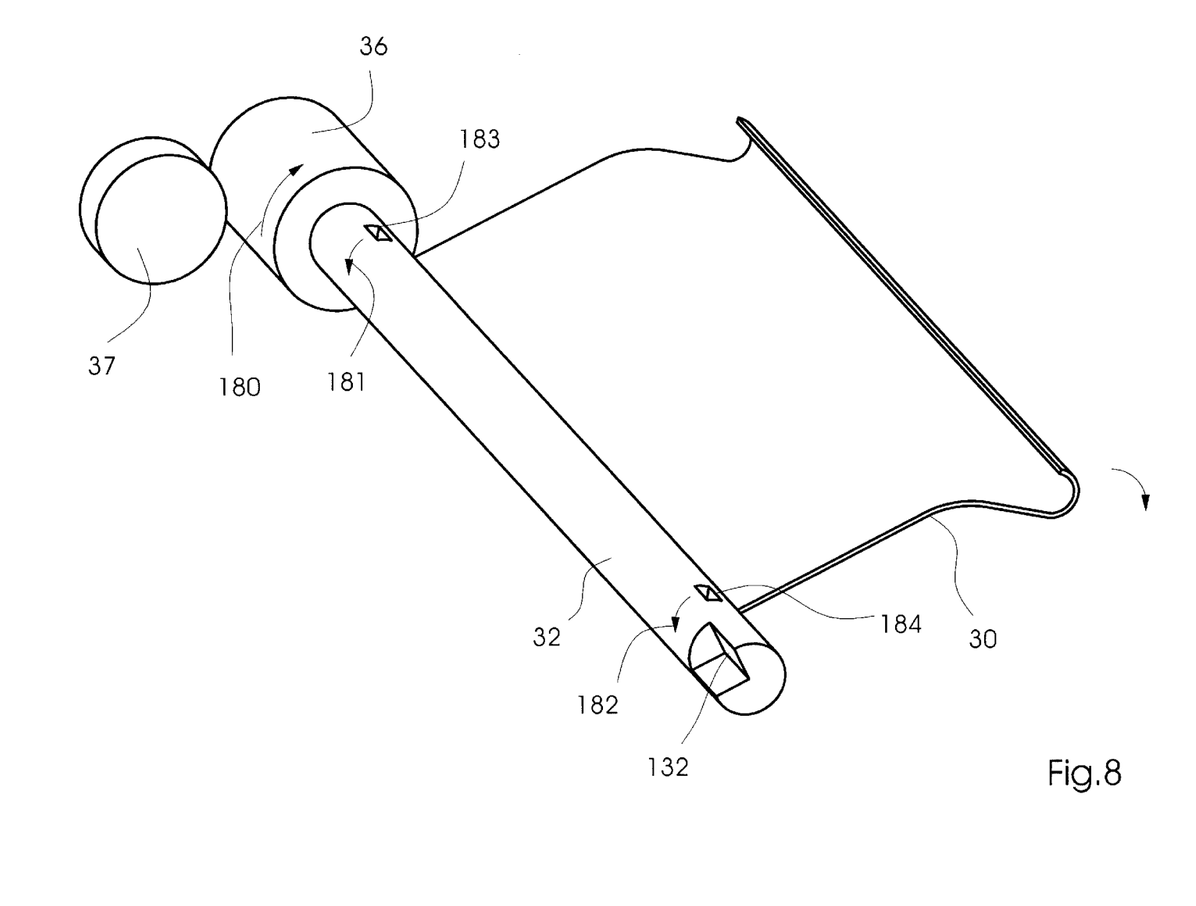
FIG. 8 shows schematically the second gripper arm and bar of the gripper unit of the first embodiment.

FIG. 8 shows schematically a possible configuration for the bar 32, actuating lever 36 and second gripper arm 30, all of which are fixedly connected to one another. The lever may be acted upon by actuating pin 37 to rotate the lever 36 in the direction of arrow 180, which operated counter to a spring force indicated by arrows 181 and 182. Bar 32 may have two slots 183 and 184 into which leaf springs, for example, can be fit to provide the spring force. The other ends of the leaf springs can be attached to the housing 3 (see FIG. 4). The step 132 on bar 32 is also shown.

Figure 9:
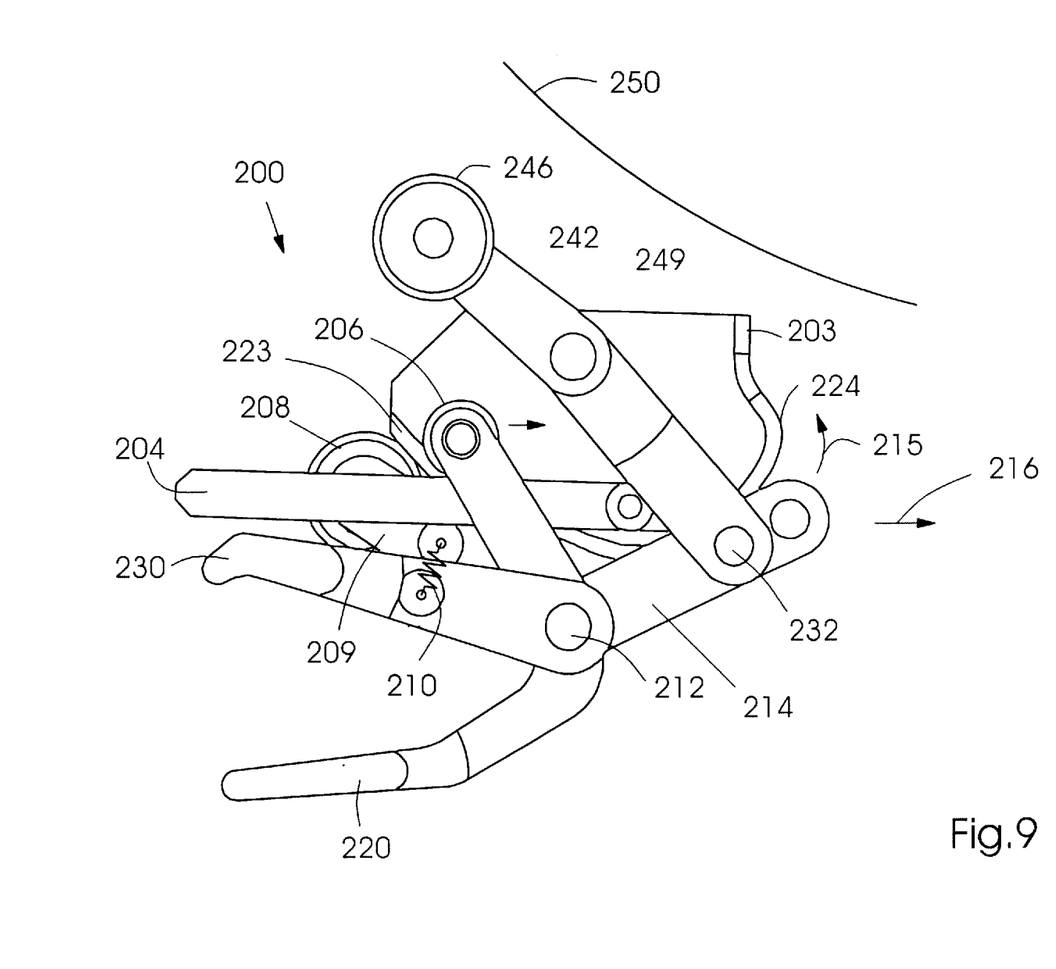
FIG. 9 shows a side view of a second embodiment of a gripper unit according to the present invention.
Figure 10:
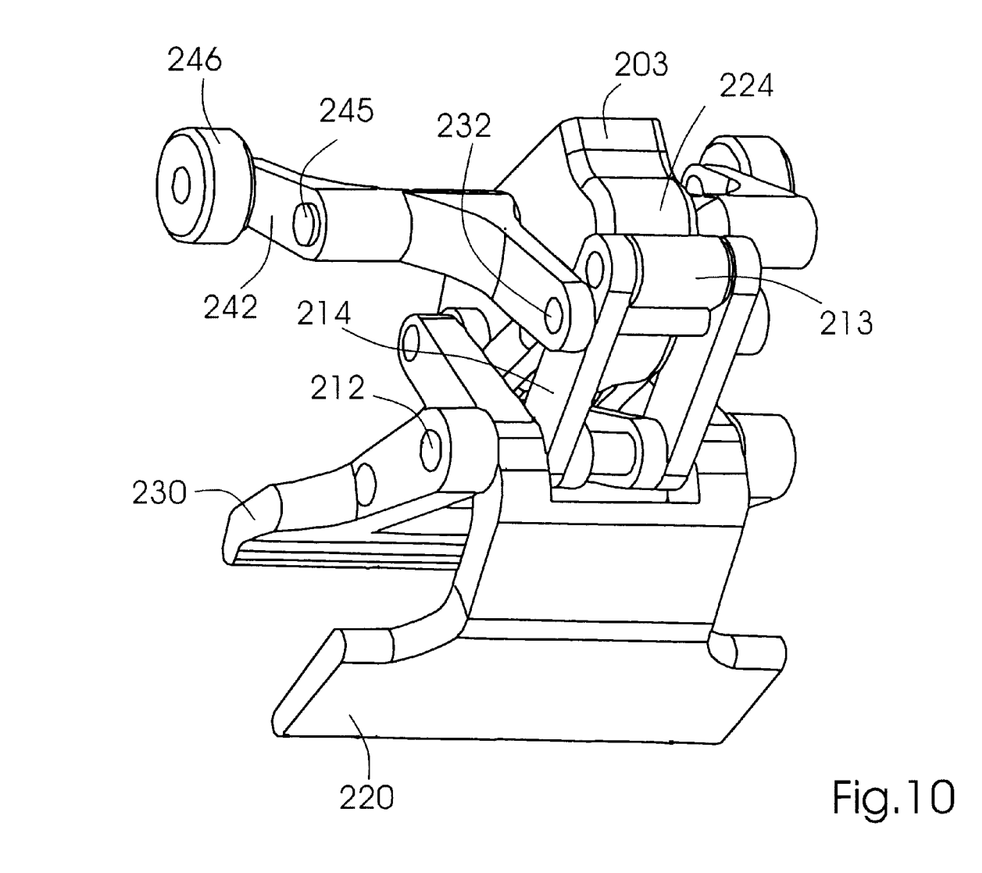
FIG. 10 shows a perspective view of the rear and side of the second embodiment.
Figure 11:
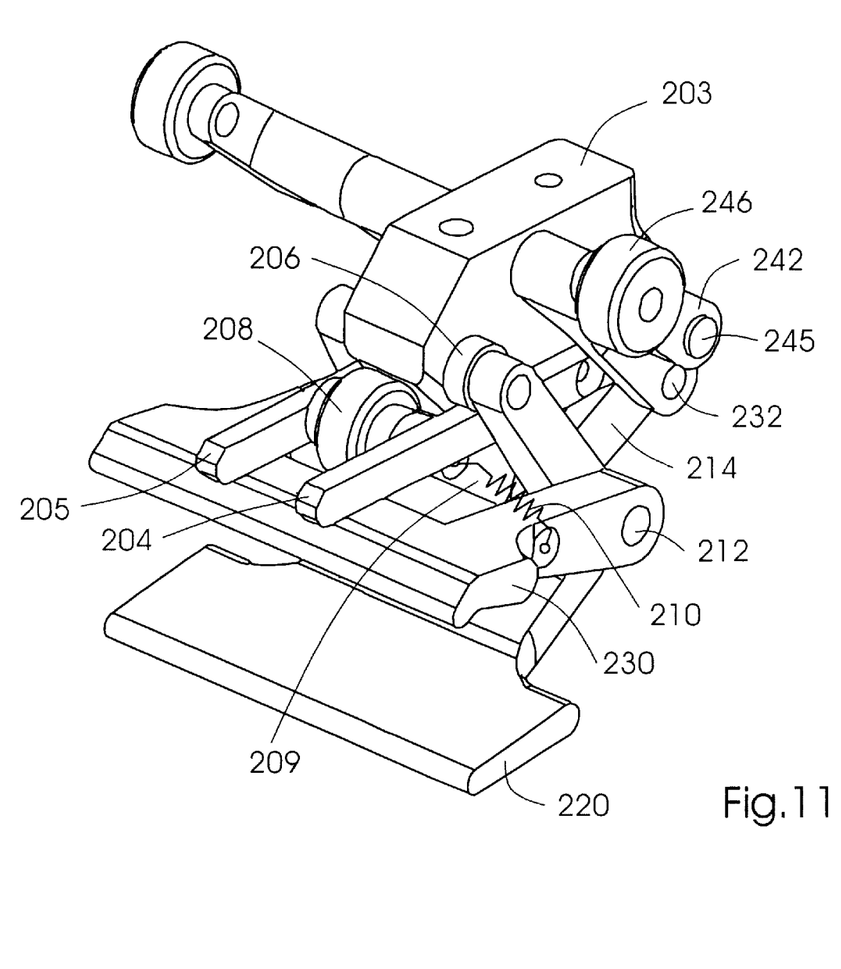
FIG. 11 shows a top perspective view of the gripper unit of FIG. 9.
Figure 12:
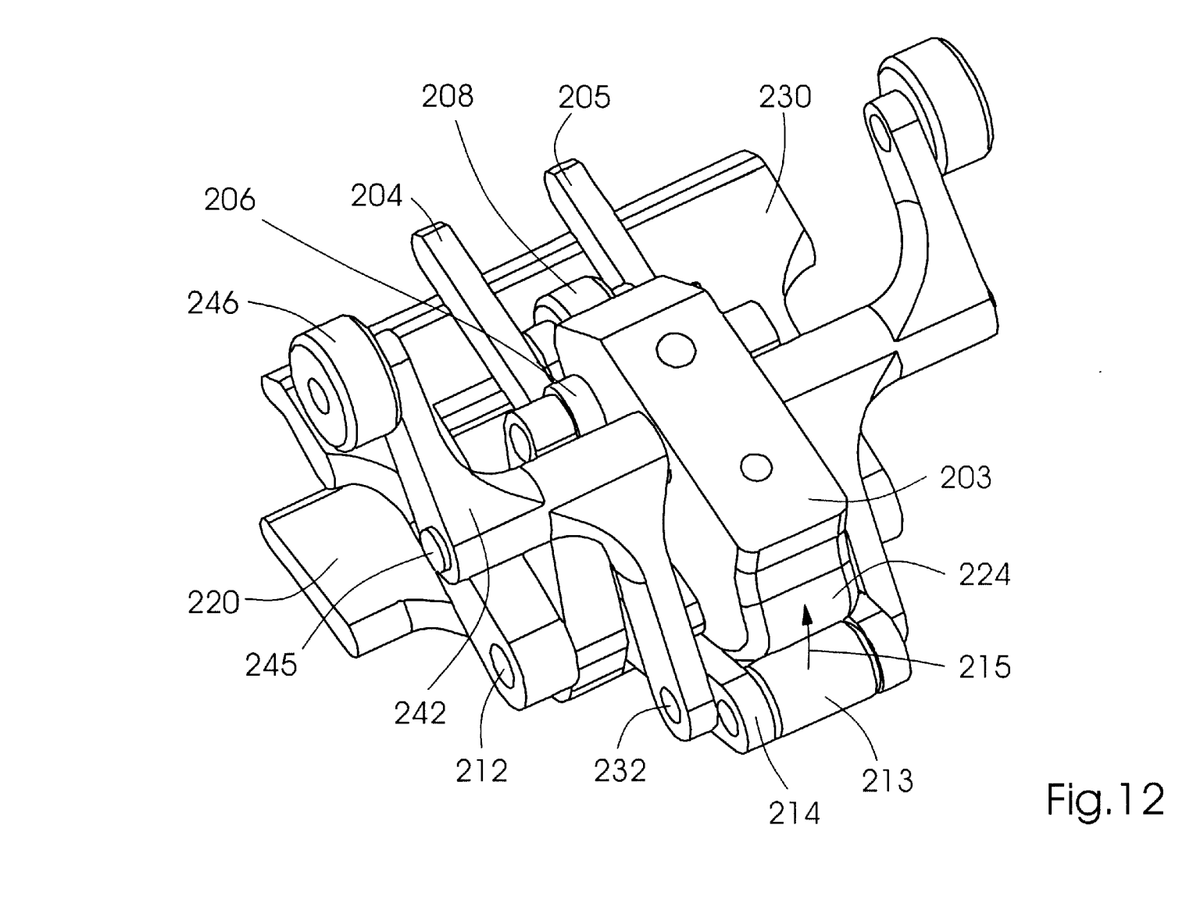
FIG. 12 shows a front side perspective view of the gripper unit of FIG. 9.

FIG. 9 shows a side view of a second embodiment of the present invention including a gripper unit 200. Gripper unit 200 includes a housing 203 having attached prongs 204 and 205 (FIG. 11). Housing 203 has two roller surfaces 223 and 224, on which a roller 208 and a roller 213 (FIG. 12) can move, respectively.

Figure 13:
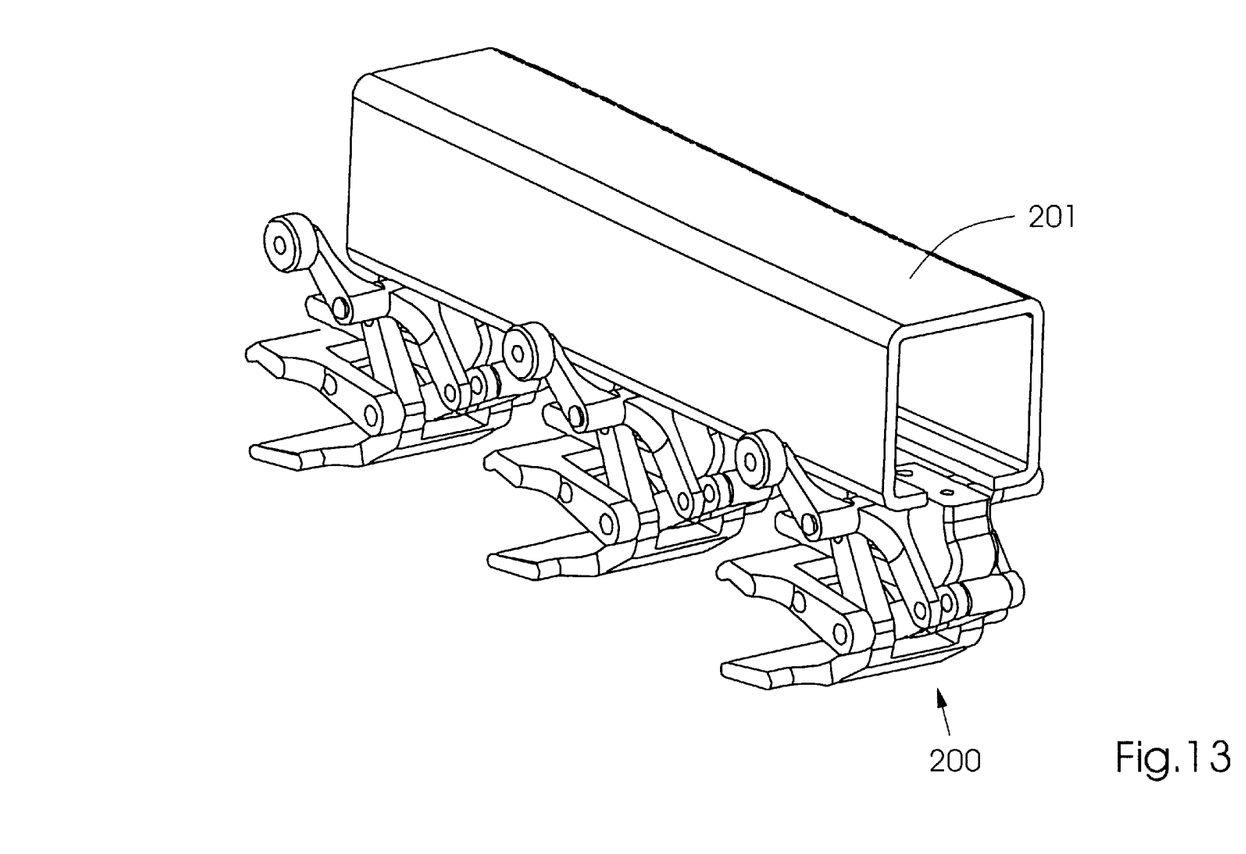
FIG. 13 shows the gripper units of the second embodiment in a track.
Figure 14:
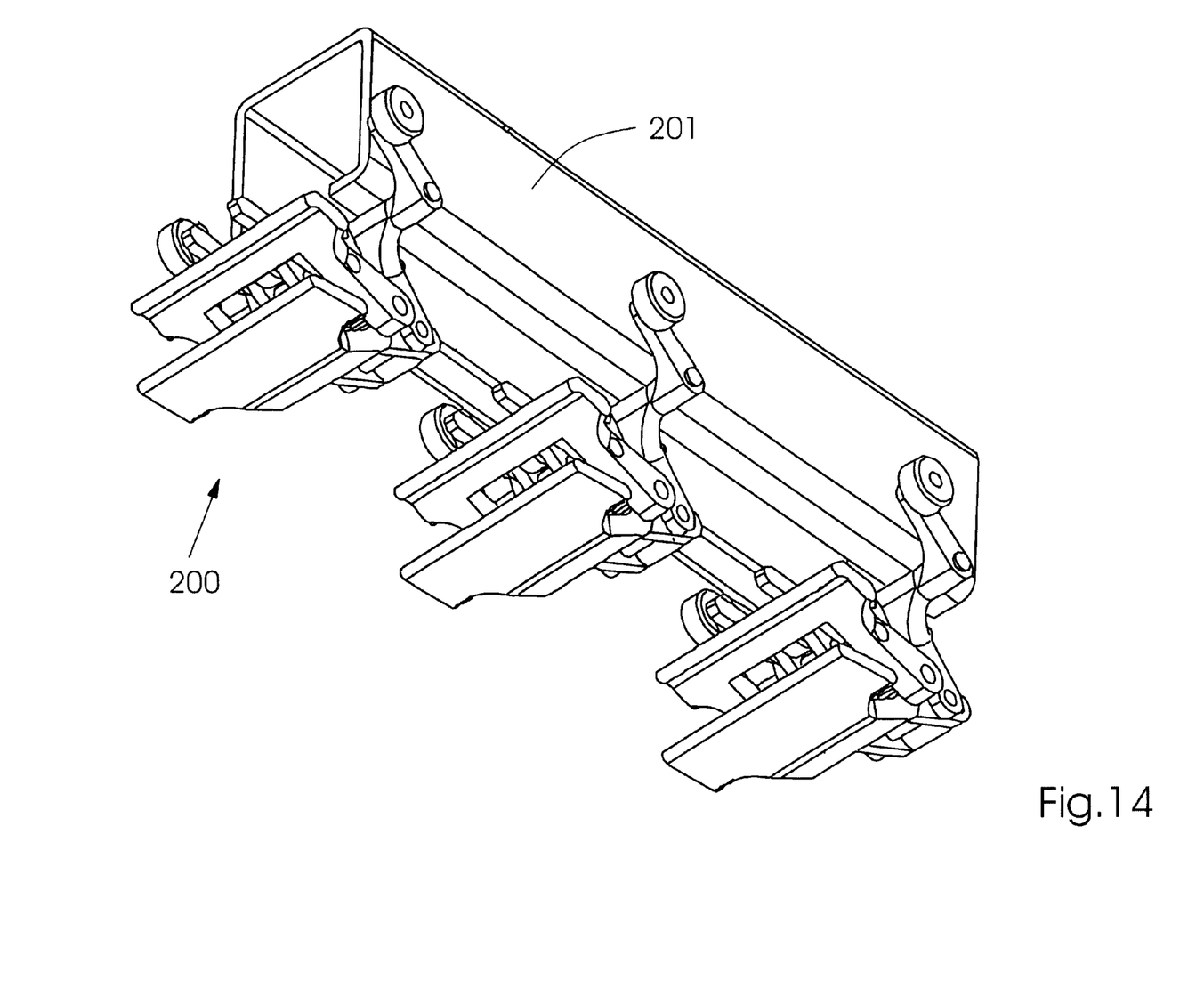
FIG. 14 also shows the gripper units of the second embodiment in a track.

As shown in FIGS. 13 and 14, gripper units 200 move in a track 201, the housing 203 being attached at the top for example to a chain running in track 201.

As shown in FIGS. 9, 10, 11 and 12, gripper unit 200 includes a first gripper arm 220 and a second gripper arm 230 for gripping a printed product. First gripper arm 220 is supported by rollers 206, which can roll along prongs 204, 205, so that gripper arm 220 slides with respect to housing 203.

Second gripper arm 230 is rotatably connected to arm 220 at pivot 212. A Bellevue spring washer arrangement 210, shown schematically, keeps arm 230 open when the arm 220 is in a rear position (to the left in FIG. 9). The other end of the spring is attached to an arm 209 connected to roller 208 at one end and to a pin 212 at the other end. The spring 210 actually can be located to the inside of arm 230, but is shown at the outside for clarity purposes.

Arm 230 is rotatably supported with respect to arm 220 about pin 212, which is also connected to one end of an arm 214. The other end of arm 214 is connected by a pivot 232 to a lever 242, which is rotatable about a rod 245 rotatably supported in housing 203. The lever 242 has at one end a cam follower 246 which can be activated by a cam 250.

The second embodiment operates as follows: as cam 250 pushes cam follower 246 downwardly, roller 213 supported at an end of arm 214 is moved upwardly along roller surface 224 in a direction indicated by arrow 215. Pin 212 at the same time is pulled forward through arm 214 in a general direction 216 which causes gripper arms 220 and 230 to slide forward, so that rollers 206 roll forward on prongs 204, 205. Arm 209 is also pulled forward by pin 212 so that roller 208 rolls along roller surface 223 and moves downwardly as shown in FIG. 9. The tension in spring 210 thus reduces and arm 230 moves downwardly to grip a printed product between arms 220 and 230. The roller 213 can lock in the gripped position, as roller 213 can rest above a curved position in surface 224. To release the product, a cam can be provided to move cam follower 246 upwardly and roller 213 downwardly.

The second embodiment may be preferable to the first embodiment, in that no latches are required and rolling produces the sliding so that friction is reduced.

The term "gripper arm" as used herein can include any structure used to grip a printed product and not just the bent sheets shown in the figures. The term "housing" as used herein can include any structural unit including a frame or bars, and need not "house" any elements. The term "carriage" as used herein is defined broadly as a movable element. The term "sliding" as used herein is defined as a smooth relative motion between two elements and can include a rolling arrangement.

U.S. Pat. No. 5,727,783 is hereby incorporated by reference herein.

What is claimed is:

1. A movable gripper unit in combination with a printed product comprising:
   a printed product; and
   a movable gripper unit including a housing; and a first gripper arm and a second gripper arm gripping the printed product, the first and second gripper arms slidingly supported with respect to the housing.

2. A movable gripper unit comprising:
   a housing; and
   a first gripper arm and a second gripper arm for gripping a printed product, the first and second gripper arms slidingly supported with respect to the housing;
   wherein the housing includes a first slot and a second slot, and further comprising a first carriage movable in the first slot and a second carriage movable in the second slot, the first and second gripper arms being connected to the first and second carriages.

3. The movable gripper unit as recited in claim 2 further comprising a first bar, the first gripper arm being fixedly connected to the first bar, and the first bar being non-rotatably supported between the first and second carriages.

4. The movable gripper unit as recited in claim 2 further comprising a rotatable bar, the rotatable bar being rotatably supported between the first and second carriages and being fixedly connected to the second gripper arm.

5. The movable gripper unit as recited in claim 4 wherein the rotatable bar is spring-loaded with respect to the first and second carriages.

6. The movable gripper unit as recited in claim 2 further comprising a latch for latching the rotatable bar.

7. The movable gripper unit as recited in claim 1 wherein the housing has an inverted U-shape.

8. The movable gripper unit as recited in claim 2 further comprising a hinge for moving the carriages, one end of the hinge being connected to the carriage and another end of the hinge connected to the housing.

9. The movable gripper unit as recited in claim 8 further comprising a cam attached to the hinge.

10. A movable gripper unit comprising:
    a housing;
    a first gripper arm and a second gripper arm for gripping a printed product, the first and second gripper arms slidingly supported with respect to the housing; and
    a cam connected to the first and second gripper arms for sliding the first and second gripper arms with respect to the housing.

11. A movable gripper unit comprising:
    a housing;
    a first gripper arm and a second gripper arm for gripping a printed product, the first and second gripper arms slidingly supported with respect to the housing; and
    an actuating lever connected to the second gripper arm for closing the second gripper arm against the first gripper arm.

12. A movable gripper unit comprising:
    a housing; and
    a first gripper arm and a second gripper arm for gripping a printed product, the first and second gripper arms slidingly supported with respect to the housing;
    wherein the first gripper arm is non-rotatable and the second gripper arm is rotatable.

13. A movable gripper unit comprising:
    a housing; and
    a first gripper arm and a second gripper arm for gripping a printed product, the first and second gripper arms slidingly supported with respect to the housing;
    wherein the first gripper arm is connected to at least one roller and the housing includes at least one prong, the at least one roller for rolling along the at least one prong.

14. The movable gripper unit as recited in claim 13 wherein the second gripper arm is connected to the first gripper arm by a pin and is spring-loaded in an open position.

15. The movable gripper arm as recited in claim 14 wherein the pin is connected to a cam follower for pulling moving the pin.

16. The movable gripper as recited in claim 15 wherein the pin is connected to a support arm, the support arm being connected to a spring, the spring being connected as well to the second gripper arm.

17. A gripping device comprising:
    a track; and
    a plurality of gripper units running in the track, each gripper unit including a housing, and a first gripper arm and a second gripper arm for gripping a printed product, the first and second gripper arms slidingly supported with respect to the housing.

18. The gripping device as recited in claim 17 wherein each gripper unit further includes a cam connected to the first and second gripper arms for sliding the first and second gripper arms with respect to the housing.

19. The gripping device as recited in claim 18 further comprising a cam follower for interacting with the cam.

20. A method of gripping a printed product comprising the steps of:
    gripping a printed product in a gripper unit; and
    moving the printed product with respect to the gripper unit while the printed product remains gripped, the moving step including sliding the printed product with respect to the gripper unit.

21. A method of gripping a printed product comprising the steps of:

gripping a printed product in a gripper unit;

moving the printed product with respect to the gripper unit while the printed product remains gripped, and moving the gripper unit at a constant velocity, and decelerating the printed product during the moving of the printed product step.

* * * * *